3,317,282
FIELD TEST FOR INDICATING AND MEASURING QUATERNARY AMMONIUM COMPOUNDS
Harold J. Antonides and Ralph L. Dietchweiler, Kankakee, Ill., assignors to Armour Pharmaceutical Company, Chicago, Ill., a corporation of Delaware
No Drawing. Filed Mar. 22, 1963, Ser. No. 267,355
11 Claims. (Cl. 23—230)

The present invention relates to a method of indicating and measuring quantitatively the presence of quaternary ammonium compounds in water mixtures of unknown quantitative composition. More particularly, this invention relates to an improved method for measuring in such mixtures the presence of quaternary ammonium compounds in the range of zero to five parts per million (p.p.m.) within an accuracy of one p.p.m.

As the art of algicide and sanitizing products containing quaternary ammonium compounds has developed, a need has presented itself for convenient field test methods whereby the concentration of such compounds in water can be both detected and accurately measured so that these quaternary materials can be maintained at minimum effective levels while excessively high concentrations, which may produce toxic effects and/or waste can be avoided.

Various methods for detecting the presence of quaternary ammonium compounds have been published for micro determinations including the range of zero to 10 p.p.m. While these methods permit the detection of quaternary ammonium compounds, the test procedures involved are such that the methods are suitable only for laboratory use and require special equipment or instruments and skilled personnel.

Presently, there are no known field test methods for both detecting and accurately measuring quaternary ammonium compounds in incremental concentrations especially in the range of from zero to 5 p.p.m.

One prior art test is capable of detecting the presence of quaternary ammonium compound and indicates, by change of color, a gross degree of the quaternary present. For example, this test indicates that no quaternary is present by retaining a clear color, the presence of quaternary of greater than zero up to six parts per million by turning a purple color, and a quaternary concentration of greater than 6 p.p.m. by turning a blue color. While such gross measurement ranges have a purpose, obviously they are inadequate for the precise and accurate measurement of quaternary ammonium compounds in the concentration range of from zero to about 5 p.p.m.

The present disclosure is based upon our discovery of a test method which is capable of both detecting and accurately measuring the concentration of quaternary ammonium compounds especially in the range of 0 to 5 p.p.m. in increments of 1 p.p.m. and even, if desired, provides for further interpolation therebetween. Solutions having a quaternary concentration in excess of 5 p.p.m. may be tested by making appropriate dilutions of the sample with water.

Accordingly, a prime object of the present invention is to provide an improved method for detecting and accurately measuring the concentration of quateranry ammonium compounds in the range of 0 to 5 p.p.m. in increments of 1 p.p.m.

Another object of the present invention is to provide an improved method for detecting and accurately measuring the concentration of quaternary ammonium compounds which is readily performed under field conditions.

These and still further objects, as shall hereinafter appear, are fulfilled by the present invention in remarkably unexpected fashion as may be discerned from the following detailed description of exemplary embodiment of the present invention.

In the practice of the present invention, the only equipment needed is a calibrated tube, for example, a silicone treated glass tube having a 15 ml. and a 17 ml. increment marked thereon, a plastic stopper, and a color card prepared in the manner as will be described. Of course, an adequate supply of our special reagent is also needed to practice the invention.

In one useful form of the invention, a water sample containing an unkown quaternary concentration, either between or dilutable to between zero and 5 p.p.m. as determined by known techniques, is poured into a siliconized test tube. The quaternary ammonium compound may be any of the conventional quaternaries such, for example, as trimethyl octadecyl ammonium chloride (a typical reagent employed for water treatment). In practice, the water sample is poured into the special siliconized tube until the tube is filled to the 15 ml. mark. To the water sample thus isolated, a small but effective amount, for example, approximately 100 mg., of a special indicator-buffer powder is added. To water requiring an unusually large amount of buffer, a 200 mg. portion of the indicator-buffer powder may be added without adverse effect upon the test. When the powder is dissolved in the water, the tube is filled to the 17 ml. mark with a water-immiscible organic solvent such as chloroform. In this way approximately 2 ml. of solvent are used with approximately 15 ml. of water. After the introduction of the solvent, the tube is capped with the plastic stopper and shaken for approximately 20 seconds. During shaking, the water, powder and solvent are thoroughly admixed. The immiscible layers are then allowed to separate. One layer is formed superposed to a second layer adjacent the bottom of the tube. The color of the solvent layer is then visually compared and matched with the colors on a standardized color card whereupon the quaternary ammonium compound concentration of the sample is quantitatively determined. This procedure shall hereinafter be described in greater detail.

Our special indicator-buffer powder may be prepared in varying compositions as shall hereinafter be described. A small but effective amount is all that is needed, for example, a 100 milligram portion is usually adequate per individual test.

One buffer-indicator powder suitable for practice of the invention is formed by admixing approximately 86.5 mg. of potassium biphthalate, approximately 13.5 mg. of sodium hydroxide, and approximately 50 mcg. of bromo chloro phenol blue.

A second buffer-indicator powder suitable for practice of this invention is formed by admixing approximately 91.04 mg. potassium biphthalate, approximately 8.91 mg. of lithium hydroxide and approximately 50 mcg. of bromo chloro phenol blue.

Still another indicator-buffer powder suitable for practice of this invention is formed by admixing approximately 83.29 mg. of sodium succinate, approximately 16.66 mg. of anhydrous succinic acid, and approximately 50 mcg. of bromo chloro phenol blue. Generally, we prefer this later composition.

The indicator-buffer powder is prepared so that when dissolved in water it produces a pH within the range of 5.4 to 6.0 and preferably a pH of approximately 5.5 to 5.6. The buffers are necessary to produce the pH of 5.4 to 6.0 in the various waters which may be encountered to provide optimal color differentiation between the various quaternary concentrations in the waters.

After the powder, which as indicated contains a dye, is shaken with the water and solvent, the dye, for example, the bromo chloro phenol blue, reacts with quaternary ammonium compounds in the water to form a colored complex which is preferentially soluble in the organic-solvent. The unreacted bromo chloro phenol blue is not soluble in the water-immiscible organic solvent used and therefore cannot contaminate the test.

The bromo chloro phenol blue quaternary ammonium compound complex is extractable from the aqueous solution by the water-immiscible organic solvent, preferably chloroform. This also occurs during shaking. While, as indicated, chloroform is a preferred solvent, other organic solvents are suitable for use with the invention and include ethyl acetate, n-butyl acetate, n-butanol, and methylene chloride. Benzene, toluene, diethyl ether carbon tetrachloride and xylene will also function, but because of a tendency to distort color, are considered less satisfactory.

The varying concentrations of quaternary ammonium compound present will produce complexes of various colors with the bromo chloro phenol blue when extracted by the organic solvent in the manner indicated. The differentiation of the concentrations of quaternary ammonium compound at 1 p.p.m. increments within the pH range of 0 to 5 p.p.m. is best accomplished within the pH range of 5.4 to 6.0 and preferably in the pH range of 5.5 to 5.6 and produces optimum differentiation, although it has been found that other pH ranges may be utilized if optimum incremental differentiation is not desired.

Satisfying results are obtained when our method is used to measure conventional quaternary ammonium compounds such, for example as, the previously described trimethyl octadecyl ammonium chloride; as well as the water soluble form of simple amines such, for example as dodecylamine hydrochloride; and the newer and somewhat different quaternaries such, for example, as methyl octadecyl dipolyoxypropylene ammonium methyl sulfate.

It is of course understood that my method is quantitative and not necessarily qualitative, that is, amounts are discernible although the identification of specific compounds, when desired, will be accomplished by other methods which are beyond the scope of the present disclosure.

The pH range of bromo chloro phenol blue when used conventionally as a titration indicator is 3.2 to 4.8. The present test, however, is conducted at a pH of 5.4 or higher so that the aqueous phase is of a bluish color. The bromo chloro phenol blue-quaternary ammonium compound complex, when extracted from the aqueous phase with the chloroform or other suitable organic solvent, within the preferred pH range of 5.5 to 5.6 produces colors in the layer of the water-immiscible organic solvent as follows: When there is 0 p.p.m., the layer is colorless; 1 p.p.m., light yellow; 2 p.p.m., straw yellow; 3 p.p.m., yellowish green; 4 p.p.m., bluish green; and 5 p.p.m., blue.

The color card is prepared by following the steps of the invention with solutions of known quaternary concentrations and identifying the colors with the standard ink charts already used in the preparation of color charts for other tests.

Preferably, each quaternary or combination of quaternaries to be measured should be the object of specific standard cards for maximum accuracy.

As previously disclosed, the use of siliconized tubes is extremely important because of the tendency of quaternaries to adhere to the surface of ordinary glass tubes. The quaternary which adheres to ordinary glass tubes is not easily removed and can therefore provide contamination for subsequent tests. On the other hand, the tubes which are siliconized eliminates the retention of quaternary residuals on the tube and avoids contamination of subsequent tests.

We have found that highly satisfactory siliconized tubes can be prepared using a silicone such, for example, as DC 35 emulsion as a 5% solution in water or DC 200 as a 5% solution in carbon tetrachloride. To prepare the tubes, the tubes are immersed in the solution withdrawn, and then heated at about 180° C. for a period of from three to four hours whereupon the silicone is polymerized on the tube.

The present invention is especially adaptable into test kit form. The kit, if desired, may further be equipped with chlorine and pH test reagents. For example, the chlorine test utilizing ortho toluidine and a pH test utilizing phenol red, both of which are well known, are readily incorporated into a kit and would additionally permit chlorine and pH measurements in the field.

Of course use of this invention is not limited to swimming pools since it fulfills a need in the management of ornamental ponds, cooling towers, fire reservoirs and other water supplies where quaternary compounds are added for a variety of reasons.

From the foregoing, it becomes apparent that a new and improved method of measuring the concentration of quaternary ammonium compounds has been described which fulfills all of the aforestated objectives to a remarkably unexpected extent. It is of course understood that such modifications, alterations, and applications as may occur to the skilled artist and when confronted with this disclosure, are intended within the spirit hereof, especially as defined by the scope of the claims appended hereto.

What is claimed is:

1. A field test method for indicating and measuring the presence of from zero to 5 p.p.m. of quaternary ammonium compounds in a contained body of water comprising: isolating a sample of water from said body; dissolving in said sample an amount of an indicator-buffer powder containing bromo chloro phenol blue sufficient to bring said solution to a pH of 5.4 to 6.0; adding chloroform to said solution; shaking said solution and said chloroform to form an admixture in which quaternary ammonium compounds present in said water form with said bromo chloro phenol blue a soluble colored complex, said complex being preferentially solubilzed in said chloroform to form a chloroform-complex solution; separating said water from said chloroform-complex solution; and matching said color of said chloroform-complex solution with a standard color card to determine quantitatively said presence of quaternary ammonium compounds.

2. The method according to claim 1 in which said powder is of an amount to bring the pH of said solution to 5.5–5.6.

3. The method of claim 1 in which said indicator-buffer powder comprises potassium biphthalate; a compound selected from the group consisting of the hydroxides of sodium and lithium; and bromo chloro phenol blue.

4. The method of claim 1 in which the indicator-buffer powder comprises anhydrous sodium succinate, anhydrous succinic acid, and bromo chloro phenol blue.

5. A field test method for measuring the presence of from zero to 5 p.p.m. of quaternary ammonium compounds in a contained body of water comprising: isolating a sample of water from said body; dissolving in said sample an amount of an indicator-buffer powder containing bromo chloro phenol blue sufficient to bring the solution to a pH of 5.4 to 6.0; adding to said water solution a water-immiscible organic solvent selected from the group consisting of chloroform, methylene chloride; ethyl acetate, n-butyl acetate, n-butanol, benzene, toluene, diethyl ether, carbon tetrachloride and xylene; shaking said water, said solvent, and said indicator-buffer powder to form an admixture in which quaternary ammonium compounds present in said water form with said bromo chloro phenol blue a soluble colored complex, said complex being preferentially solubilized in said organic solvent; separating said water from said water immiscible solvent containing said complex; and matching said color of said complex with a standard color card to determine quantitatively said presence of quaternary ammonium compounds.

6. The method according to claim 5 in which said powder is added in an amount to bring the pH of said solution to 5.5–5.6

7. The method of claim 5 in which said buffer-indicator powder is a mixture consisting of potassium biphthalate, a hydroxide selected from sodium and lithium hydroxides, and bromo chloro phenol blue.

8. The method of claim 5 in which said buffer-indicator powder is a mixture consisting of sodium succinate, succinic acid, and bromo chloro phenol blue.

9. A composition of matter comprising from about 86 to about 91 percent by weight of potassium biphthalate, from about 9 to about 14 percent by weight of a hydroxide selected from sodium and lithium hydroxides and about 0.05 percent by weight of bromo chloro phenol blue.

10. A composition of matter comprising about 83% by weight anhydrous sodium succinate, about 16% by weight anhydrous succinic acid, and about 0.05 percent by weight bromo chloro phenol blue.

11. A method of colorimetrically indicating and measuring the presence of quaternary ammonium compounds in water samples in the field in the absence of expensive laboratory equipment comprising adjusting the pH of said sample to 5.4–6.0 while introducing bromo chloro phenol blue thereinto; introducing into said sample a water-immiscible organic solvent selected from the group consisting of chloroform, methylene chloride, ethyl acetate, n-butyl acetate, n-butanol, benzene, toluene, diethyl ether, carbon tetrachloride and xylene; agitating said sample and said solvent to admix bromo chloro phenol blue with quaternary ammonium compounds present therein, said quaternary ammonium compounds form with said bromo chloro phenol blue a soluble colored complex, said complex being preferentially solubilized in said organic solvent; separating said complex-containing organic solvent from said water; and matching said color of said complex with a standardized color card to indicate the quantity of quaternary ammonium compounds in said water.

References Cited by the Examiner

UNITED STATES PATENTS 2,471,861  5/1949  Cahn _____ 23—230
2,599,697  6/1952  Conklin _____ 23—230

OTHER REFERENCES

Auerback I, Ind. Eng. Chem., Anal. Ed., 15, pp. 492–493 (1943).

Auerback II, Ind. Eng. Chem., Anal. Ed., 16, p. 739 (1944).

Kirk-Othmer, "Encyclopedia of Chem. Tech.," vol. 7, p. 716.

MORRIS O. WOLK, *Primary Examiner.*

Z. PAROCZAY, *Assistant Examiner.*